United States Patent
Richard et al.

(10) Patent No.: US 7,134,385 B1
(45) Date of Patent: Nov. 14, 2006

(54) COOKING APPARATUS AND METHODS

(75) Inventors: Casanzio J. Richard, Rockford, IL (US); Jarrad A. Johnson, Flowood, MS (US)

(73) Assignee: The Broaster Company, Beloit, WI (US)

( * ) Notice: Subject to any disclaimer, the term of this patent is extended or adjusted under 35 U.S.C. 154(b) by 594 days.

(21) Appl. No.: 10/426,517

(22) Filed: Apr. 30, 2003

Related U.S. Application Data

(60) Provisional application No. 60/376,741, filed on May 1, 2002.

(51) Int. Cl.
*A47J 37/12* (2006.01)

(52) U.S. Cl. .......................... 99/403; 99/407; 220/812; 220/816

(58) Field of Classification Search ................. 99/403, 99/407, 372, 349; 219/440, 431; 220/315, 220/316, 318, 252, 812, 815, 811, 813, 814, 220/816; 126/369, 391; 292/257, 259 R
See application file for complete search history.

(56) References Cited

U.S. PATENT DOCUMENTS

| | | | | |
|---|---|---|---|---|
| 639,014 A | * | 12/1899 | Bradley | 220/812 |
| 2,338,477 A | * | 1/1944 | Wolters et al. | 220/812 |
| 2,827,379 A | | 3/1958 | Phelan | 99/107 |
| 2,914,063 A | * | 11/1959 | Wagner | 126/381.1 |
| 2,917,200 A | | 12/1959 | Phelan et al. | 220/55.3 |
| 2,918,861 A | | 12/1959 | Phelan et al. | 99/408 |
| 2,938,648 A | | 5/1960 | Phelan et al. | 220/55.3 |
| 2,942,753 A | | 6/1960 | Kelton | 220/33 |
| 2,945,767 A | | 7/1960 | Phelan et al. | 99/107 |
| 2,964,215 A | | 12/1960 | Kelton | 220/57 |
| 2,997,941 A | | 8/1961 | Phelan et al. | 99/332 |
| 3,413,911 A | | 12/1968 | Phelan et al. | 99/355 |
| 3,413,912 A | | 12/1968 | Phelan et al. | 99/400 |
| 3,964,637 A | | 6/1976 | Luebke et al. | 220/314 |
| 3,981,044 A | | 9/1976 | Luebke et al. | 16/114 A |
| 4,287,818 A | * | 9/1981 | Moore et al. | 99/355 |
| 4,508,026 A | | 4/1985 | Anetsberger et al. | 99/407 |
| 4,721,094 A | | 1/1988 | Nett | 126/369 |
| 4,930,408 A | | 6/1990 | King et al. | 99/407 |
| 4,997,101 A | | 3/1991 | King et al. | 99/407 |
| D336,007 S | | 6/1993 | King et al. | D7/347 |
| 5,402,712 A | | 4/1995 | King et al. | 99/407 |
| 5,402,713 A | | 4/1995 | King | 99/408 |
| 5,531,155 A | * | 7/1996 | Pellicane et al. | 99/349 |
| 5,564,328 A | * | 10/1996 | Huang | 99/337 |
| 5,617,776 A | | 4/1997 | King et al. | 99/408 |
| 5,890,419 A | * | 4/1999 | Moravec | 99/349 |
| 5,974,955 A | | 11/1999 | King et al. | 99/407 |
| 5,992,680 A | * | 11/1999 | Smith | 220/812 |
| 6,105,488 A | | 8/2000 | King et al. | 99/407 |

* cited by examiner

*Primary Examiner*—Reginald L. Alexander
(74) *Attorney, Agent, or Firm*—Wilhelm Law Service, S.C.; Thomas D. Wilhelm; Eric J. Lalor

(57) ABSTRACT

Cooking apparatus, comprising a support structure, a cooking vessel having an opening therein, a cover controlling access to the vessel, and cover actuation apparatus. The cover actuation apparatus pivots the cover, and optionally includes slide structure enabling the cover to slide out of full overlying relationship with the vessel opening to a partially overlying relationship, before the pivoting action occurs. Optional biasing structure biases the cover upwardly from a position overlying the vessel opening. Preferred structure combines both sliding action and pivoting action to displace the cover from over the vessel opening, and to present the cover to the opening for sealing over the cooking vessel.

32 Claims, 10 Drawing Sheets

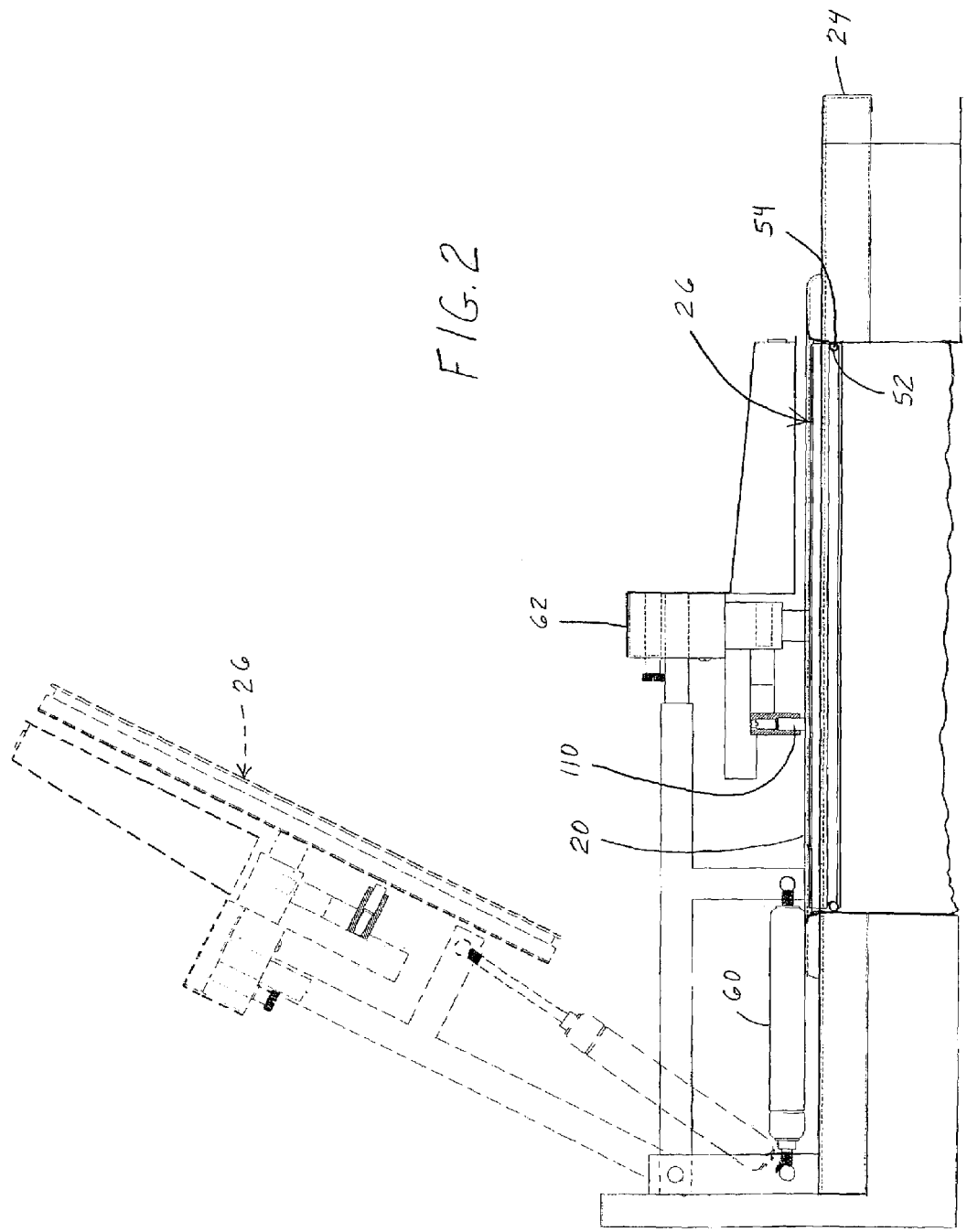

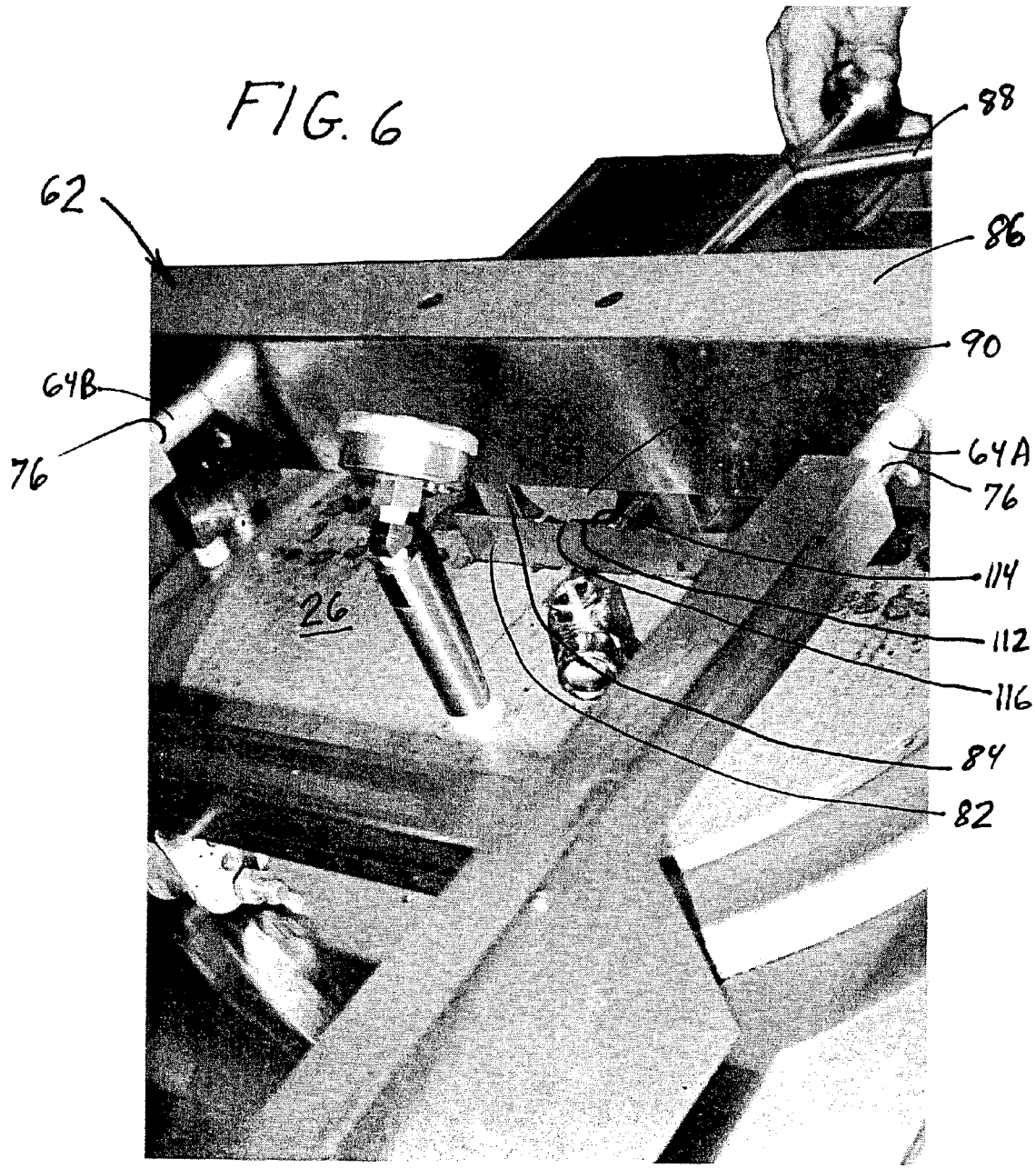

COOKING APPARATUS AND METHODS

BACKGROUND

This invention relates in general to commercial size cooking apparatus. The invention relates especially to deep fryers wherein food is cooked in edible oil. Specific application is found for the invention is fast food restaurants, which cook food under pressure in an oil environment, such as for cooking deep fried chicken, fish, and the like.

Restaurant space is generally divided between public space where customers are served, and cooking space, referred to herein after as the kitchen, where food is prepared. Since all space comes with an associated cost, there is a tension between the amount of space to be allocated to a given function and the cost of that space. Once the restaurant facility has been constructed, the operator of the restaurant typically makes infrequent changes to the space allocation. Thus, the space available in the kitchen is generally fixed for extended periods of time, measured in years.

The floor space in the kitchen can in general be thought of in terms of "fixed equipment space", namely space allocated to equipment which is fixed in place, "transient space", namely space which is occupied by equipment and supplies on a temporary basis, and "people space", namely space which must be available to be occupied by the kitchen workers, for their required movements about the kitchen as they perform their kitchen tasks.

As the needs of customers and/or the business change, it may be desirable to change the activities which take place in the kitchen. For example, new cooking equipment may need to be purchased and installed in the existing space. Where, for example, the quantity of food to be cooked in a given time span should be increased, it is desirable to be able to install a larger-capacity cooker. But such larger-capacity cooker must fit into the overall existing space in the kitchen.

Where the cooker design remains the same, only larger in size, the "fixed equipment space" demands of the cooker are greater than with the previous cooker. In such situation, the operator of the kitchen typically must choose between the larger-capacity cooker and a loss of either "transient space" or "people space". But in an efficiently-operating kitchen, loss of either "transient space" or "people space" can result in loss of efficiency attributable to such loss of "transient space" or "people space".

Accordingly, it would be desirable to provide cooking apparatus which provides increased throughput capacity of cooked food utilizing conventional cooking practices, without increasing the quantity of floor space occupied by the cooker.

It would also be desirable to provide such cooker while maintaining the same cooking process, in order that the process changes required by the kitchen workers be controlled, as well as in order to produce an identical cooked food product.

Accordingly, it is an object of the invention to provide novel cooking apparatus which provides increased throughput capacity, utilizing conventional cooking practices, without increasing the quantity of floor space required by the cooker.

It is another object to provide such cooker while maintaining the same cooking process as lesser-capacity cookers of conventional structural design.

It is a more specific object to provide closure structure for cooking apparatus wherein the cover is opened and closed for accessing an opening in the cooking vessel by a combination of movements of the cover which include sliding the cover partially out of an overlying relationship with the cooking vessel, and pivoting the cover away from the opening.

It is a further object to provide cooking apparatus wherein the cover actuation apparatus pivots the cover away from an overlying relationship with the cooking vessel and is biased toward such lifting movement by a plurality of gas springs.

It is yet a further object to provide methods of removing a cover of a pressure cooking vessel, which include lifting the cover upwardly to a position generally overlying the cooking vessel and sliding the cover transversely away from the opening of the cooking vessel, and subsequently pivoting the cover away from the opening of the cooking vessel.

SUMMARY

This invention comprehends cooking apparatus, especially pressure cooking apparatus, and methods of cooking. The cooking apparatus comprises a support structure, and a cooking vessel having an opening thereinto for access to the cooking vessel. The cooking vessel is supported by the support structure. A cooking vessel cover controls access to the cooking vessel through the opening. Pivoting cover actuation apparatus is mounted to the support structure, optionally including slide structure enabling the cover to slide partially out of a position wherein the entirety of the cover overlies the cooking vessel.

A first expression of the invention is a closure structure for a cooking apparatus. The closure structure comprises a cover for closing an opening in a cooking vessel; slide structure facilitating sliding the cover laterally into a position fully overlying the opening in the cooking vessel, and away from the position fully overlying the opening in the cooking vessel; and pivot structure pivoting the cover about a pivot axis when the cover has been slid away from the position fully overlying the opening in the cooking vessel.

In some embodiments, the closure structure further comprises biasing apparatus biasing the pivoting of the cover about the pivot axis, the biasing apparatus preferably exerting sufficient biasing force to lift the cover when the cover is mounted in the closure structure, and when the cover is out of the fully overlying relationship with the opening.

In preferred embodiments, the biasing apparatus comprises at least one, preferably multiple, gas springs.

In preferred embodiments, the pivot structure comprises a pivot base about which the cover is pivoted, and pivot linkage between the pivot base and the cover.

In some embodiments, the cover is comprised in a cover assembly, the cover assembly further comprising cover lifting apparatus, a cover support bar between the cover lifting apparatus and the cover, and slide arms supporting the cover assembly from the slide structure.

In some embodiments, the slide structure comprises an interface in a mechanical linkage between the pivot structure and the cover.

In preferred embodiments, the biasing apparatus exerts a net lifting force on the closure structure when the cover is in a lowered position and fully overlying the opening in the cooking vessel.

In preferred embodiments, the biasing apparatus raises the cover a first distance, and then substantially matches the weight of the closure structure, including the cover such that the cover is substantially effectively weightless and can be moved up or down about the pivot axis with minimal effort.

A second expression of the invention is cooking apparatus, comprising a support structure; a cooking vessel having an opening thereinto, the cooking vessel being supported by the support structure; a cover, for controlling access to the cooking vessel through the opening; and cover actuation apparatus mounted to the support structure. The cover actuation apparatus comprises slide structure facilitating sliding of the cover laterally into a fully overlying position, wherein the entirety of the cover overlies the opening in the cooking vessel, and away from such fully overlying position, and the pivot structure pivoting the cover about a pivot axis when the cover has been slid away from the fully overlying position.

In some embodiments, the cooking vessel comprises a bottom, an encompassing side wall extending upwardly from the bottom, and a longitudinal axis extending through the bottom and generally parallel with the side wall, the pivoting structure being mounted to the support structure and acting through a pivot axis extending transverse to the longitudinal axis of the cooking vessel.

In preferred embodiments, the cover actuation apparatus further comprises lifting linkages between the pivot structure and the cover, and supporting the cover from the support structure.

In some embodiments, the cover is comprised in a cover assembly, the cover assembly further comprising lowering and lifting apparatus designed and configured to lower the cover into sealing engagement with the cooking vessel, and to lift the cover out of sealing engagement with the cooking vessel.

Preferred embodiments further comprise slide stop apparatus stopping transverse sliding opening movement of the cover while the cover partially overlies the opening in the cooking vessel.

In some embodiments, the cooking apparatus further comprises limiting stop apparatus, mounted to the support structure, the limiting stop apparatus being effective to stop sliding movement of the cover as the cover is moved into the fully overlying position.

In preferred embodiments, the closure structure further comprises lifting linkage between the pivot structure and the cover assembly, and supporting the cover assembly from the support structure, the slide apparatus slidingly connecting the lifting linkage to the lowering and lifting apparatus, the lowering and lifting apparatus optionally being supported by the lifting linkage.

In some embodiments, the invention further comprises limiting stop apparatus mounted on the support structure, and engaging a latch on the cover actuation apparatus, latching the cover actuation apparatus to the support structure adjacent the cooking vessel.

Preferred embodiments further comprises a sliding cover support supporting the cover actuation apparatus from the support structure proximate the cover as the cover is slid toward or away from the fully overlying position.

Where biasing apparatus is used, the biasing apparatus preferably exerts a net lifting force on the combination of the cover and the cover actuation apparatus while the limiting stop apparatus and the latch are engaged.

A third expression of the invention is cooking apparatus, comprising a support structure; a cooking vessel having an opening thereinto, the cooking vessel being supported by the support structure; a cover, for controlling access to the cooking vessel through the opening; and cover actuation apparatus mounted to the support structure. The cover actuation apparatus comprises pivot structure enabling pivoting the cover about a pivot axis and thereby presenting the cover to the opening, and taking the cover away from the opening, and a plurality of gas springs biasing the pivoting of the cover about the pivot axis.

A fourth expression of the invention is a method of removing a cover of a pressure cooking vessel from a sealing engagement of the cover with the cooking vessel, the pressure cooking vessel being supported by support structure, and having an opening thereinto. The method comprises lifting the cover upwardly to a position generally above the cooking vessel and sliding the cover transversely away from the top opening to a position wherein a first portion of the cover is still overlying the opening, and wherein a second different portion of the cover is not overlying the opening; and subsequently pivoting the cover about a pivot axis and away from the opening and generally out of overlying relationship with the opening of the cooking vessel.

In some embodiments, the sliding of the cover transversely away from the top opening comprises engaging slide stop apparatus effective to limit the extent of transverse movement of the cover.

In some embodiments, the cover is comprised in a cover assembly with which the cover slides, and the sliding of the cover transversely away from the opening is accompanied by release of latch structure, on the cover assembly, from limiting stop apparatus on the support structure.

In preferred embodiments, the pivoting of the cover about the pivot axis is assisted by biasing apparatus biasing the cover away from the opening in the cooking vessel, optionally including biasing the cover sufficiently with the biasing apparatus to fully support the cover in an orientation pivoted away form the opening of the cooking vessel.

BRIEF DESCRIPTION OF THE DRAWINGS

FIG. 2 shows a side elevation view of the pivoting cover actuation apparatus, with the cover shown in the open position in dashed outline.

FIG. 6 shows the lowering and lifting apparatus mounted to the cover, and the cam which performs the interface function which lowers the cover into sealing engagement with the cooking vessel and lifts the cover out of sealing engagement with the cooking vessel.

Figure 1:
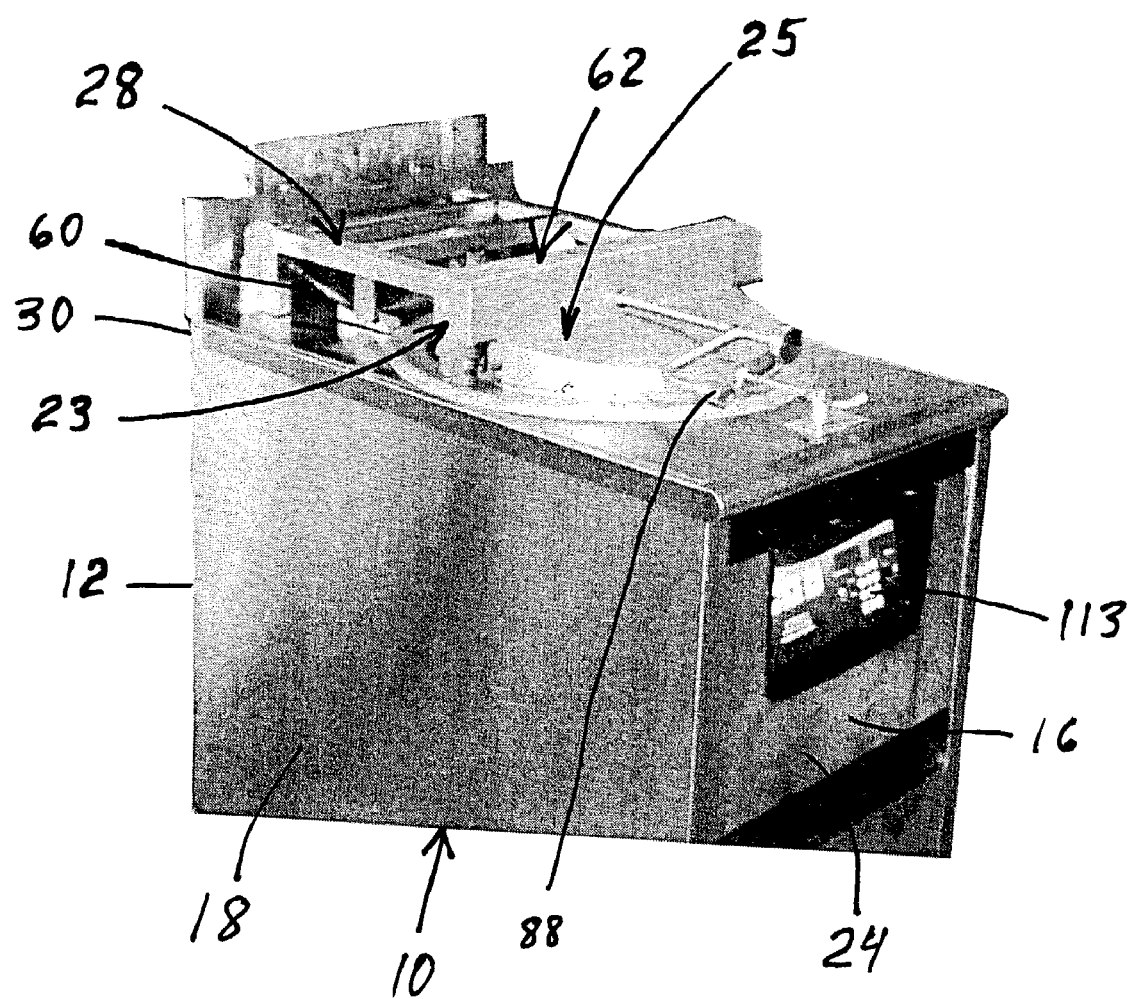
FIG. 1 shows an overall pictorial view of a pressure cooker of the invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 3:
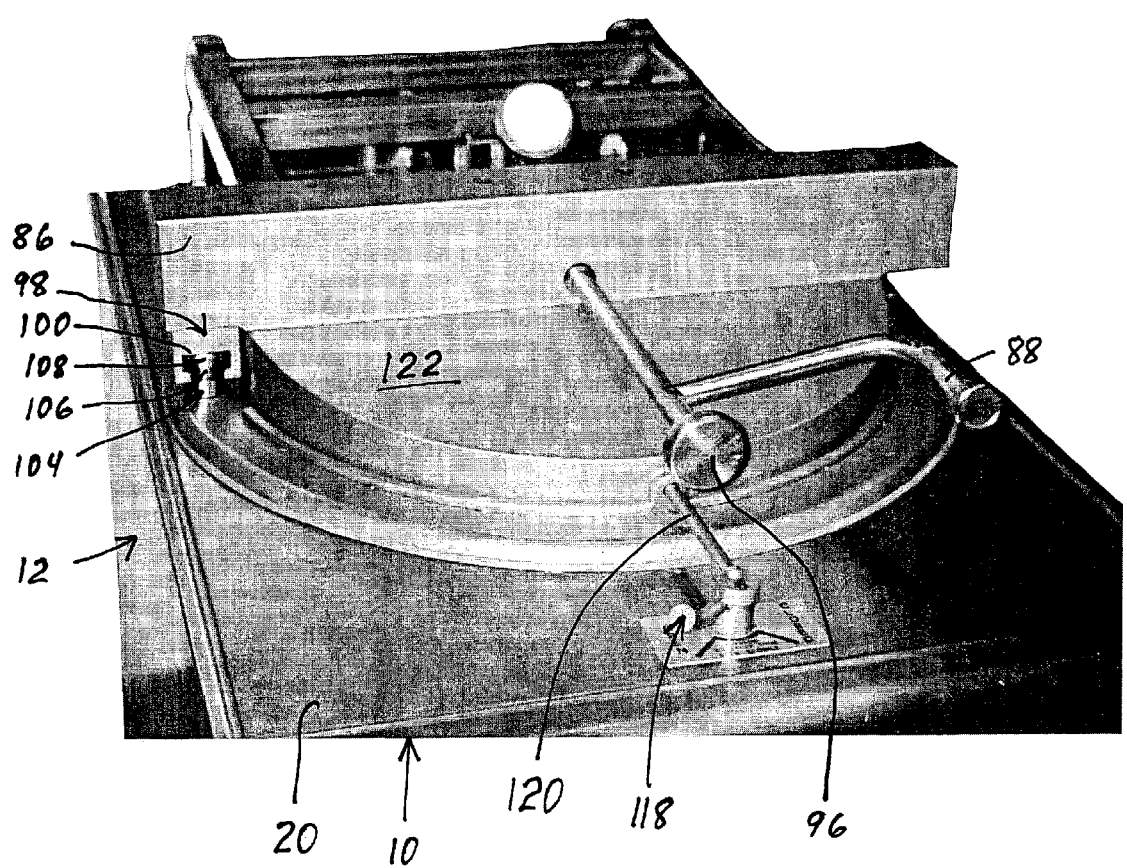
FIG. 3 shows an enlarged front pictorial view of the pressure cooker of FIG. 1, illustrating the cover, and the limiting stop which holds the cover closed while the cooking vessel is under pressure.
Figure 4:
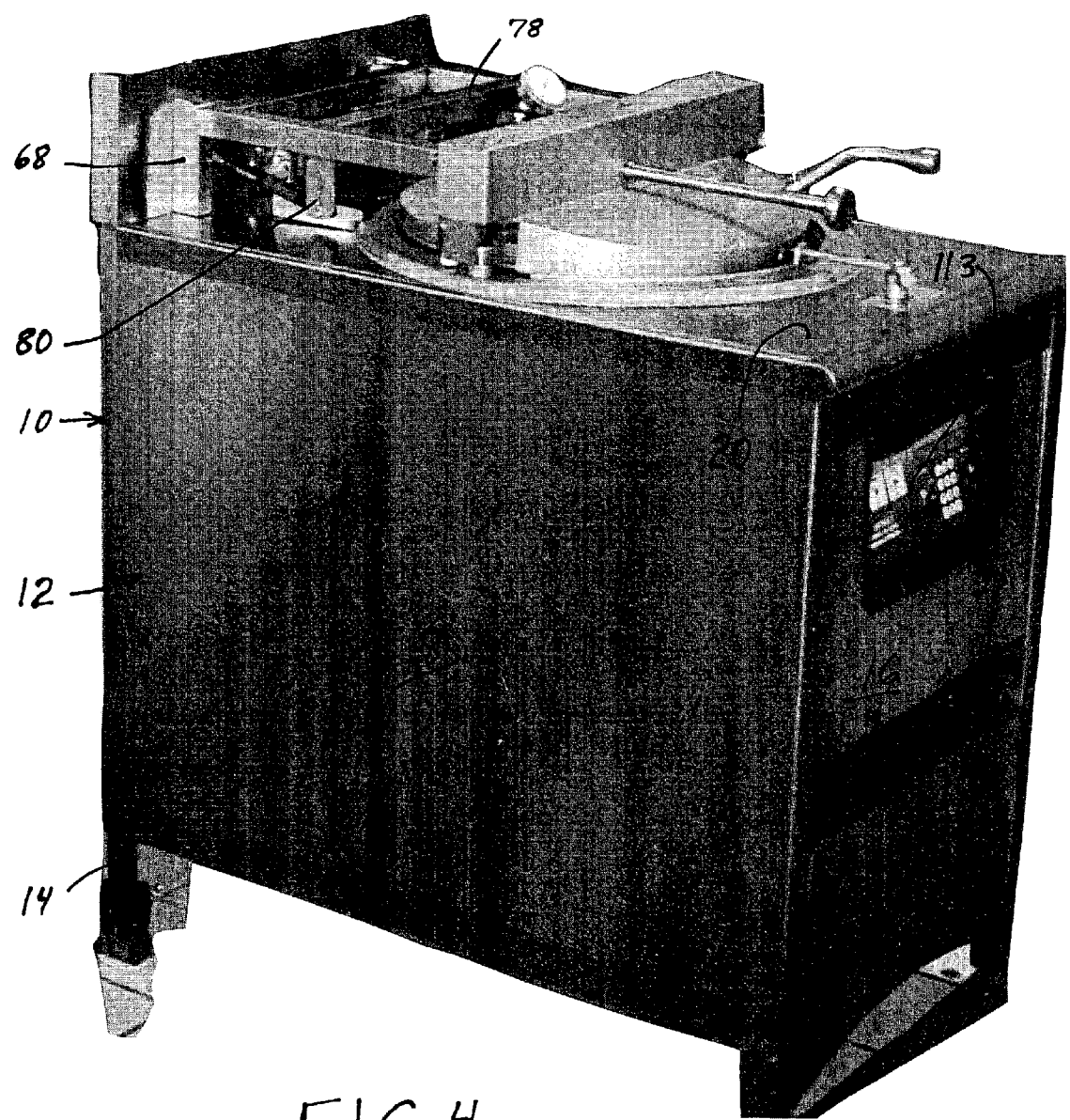
FIG. 4 shows a side pictorial view of the pressure cooker of FIG. 1 wherein rearward sliding of the cover has been initiated for release, from the limiting stop, of the pivoting cover actuation apparatus.

Turning now to the drawings, and especially to FIGS. 1, 3, and 4, there is shown a pressure cooker 10 of the invention. Pressure cooker 10 has a support structure 12 supporting the various components of the pressure cooker from an underlying floor or other base. Support structure 12 includes, for example, a plurality of legs 14 supporting the cooker from the floor. The cooker has front and rear end panels 16, left and right side panels 18, and a top panel 20. End panels 16, side panels 18, and top panel 20, in combination enclose various elements of the cooker thereby to present a clean and aesthetically pleasing appearance.

Figure 2A:
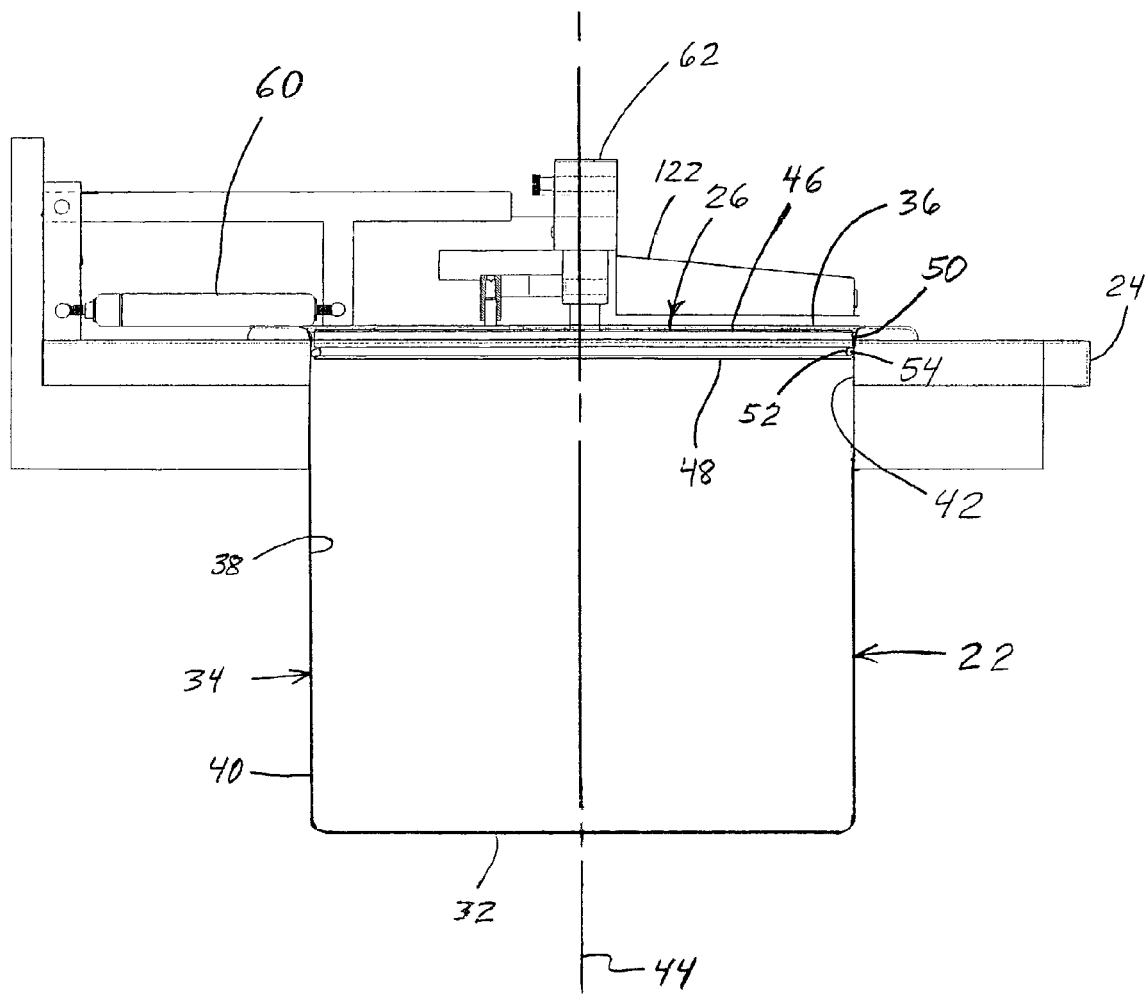
FIG. 2A shows a side elevation view as in FIG. 2, with the cover closed, and showing the full height of the cooking vessel.

Referring to FIGS. 2 and 2A, pressure cooker 10 has a cooking vessel 22 shown mounted to the cooker support structure in the top panel, toward the front 24 of the cooker. Cooking vessel 22 receives a cooking liquid such as edible oil, and food to be cooked therein.

Closure structure 23 comprises a cover assembly 25, and cover actuation apparatus 28. Cover assembly 25 includes a cover 26, which is mounted in the cooker so as to be brought into overlying covering and sealing engagement with the cooking vessel for cooking food. The cover can be unsealed from the cooking vessel, and moved away from the cooking vessel, e.g. at the end of a cooking cycle, so as to provide access to the cooking vessel such as to make the cooked food available for removal and consumption.

Cover actuation apparatus 28 is mounted to support structure 12 at the rear 30 of the cooker for pivotation with respect to a pivot mount located at or adjacent the rear of cooker 10. Cover actuation apparatus 28 generally provides support for cover 26, supporting the cover from the support structure, and pivoting the cover about the pivot mount.

Turning now to FIG. 2A, cooking vessel 22 has a bottom wall 32, and a side wall 34 extending upwardly from the bottom wall, to an open top 36, namely a vessel opening, of the cooking vessel. Side wall 34 has an inner surface 38 and an outer surface 40. The inner surface of the side wall tapers slightly outwardly in an upward direction toward open top 36, thus to provide a progressively constricting inner sealing surface 42 considering a downward direction of movement adjacent the open top. A longitudinal axis 44 of the cooking vessel extends through bottom wall 32 and upwardly in a direction generally parallel to a collective direction of extension of side wall 34.

Cover 26 has a top surface 46, a bottom surface 48, and an outer perimeter 50 extending about a circumference of the cover. A recess 52 in the outer perimeter of the cover receives an O-ring 54 which provides a sealing surface for forming an operative seal between the cooking vessel and the cover when the cover is brought into overlying relationship with the cooking vessel, and is lowered into the cooking vessel. As the cover is lowered into the cooking vessel, the taper of the inside surface of the cooking vessel side wall operates to form the desired progressively constrictive seal between the cooking vessel side wall and the cover in the process of closing and sealing the cooking vessel for cooking a load of food.

Figure 2B:
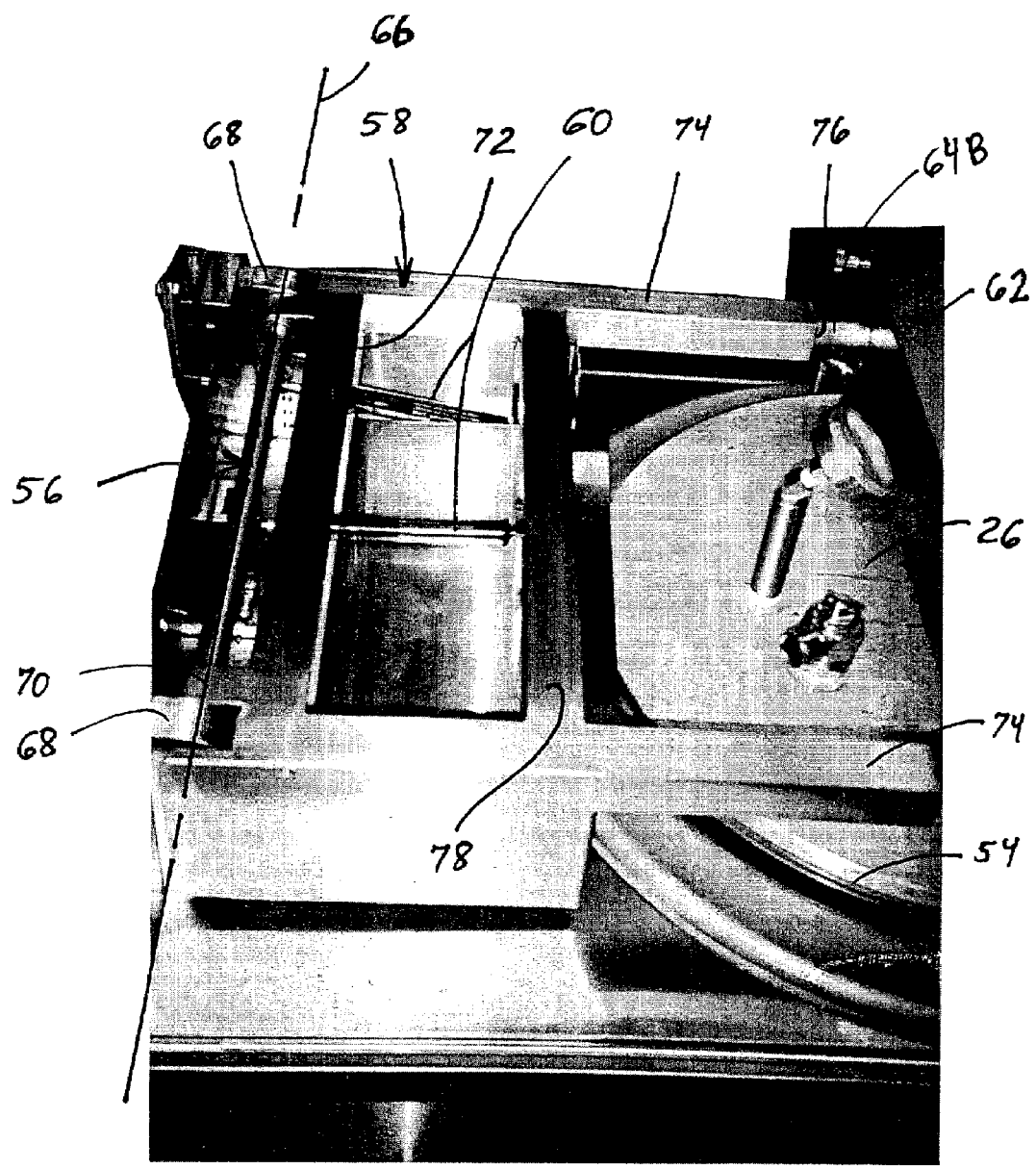
FIG. 2B shows a side pictorial view of the pivot structure, the lifting linkage, and counterbalance apparatus.

Referring to FIGS. 2B and 6, pivoting cover actuation apparatus 28 includes a pivoting structure 56 as the pivot mount, a lifting linkage 58 connecting the pivot structure to cover assembly 25, a counterbalance 60, a lowering and lifting apparatus 62, left and right slide arms 64A, 64B, and a slide stop described further hereinafter, for stopping sliding movement of the cover when the cover is being slid open.

Pivot structure 56 is illustrated in FIG. 2B as a pivot shaft mounted to left and right support posts 68 supported from support structure 12 at top panel 20. Pivot shaft 56 extends horizontally across the top of the cooker, and perpendicular to longitudinal axis 44 of the cooking vessel. Lifting linkage 58 receives pivot shaft 56 at mounting dogs 70 and pivots about shaft 56, and thus about a pivot axis 66 which extends longitudinally through shaft 56. Mounting dogs 70 extend forwardly from pivot shaft 56 to cross-arm 72. Left and right extension arms 74 extend frontwardly, and parallel to each other, from cross-arm 72 to distal ends 76 of the extension arms which operate as slide stops stopping sliding movement of the cover as the cover is being slid open. Crossbrace 78 extends between, and connects, extension arms 74 about midway between cross-arm 72 and distal ends 76, thus to provide a ladder-type construction along extension arms 74, whereby the lifting linkage is sufficiently rigid to effectively resist forces tending to bend or otherwise distort the structure of the lifting linkage.

To that end, each of cross-arm 72, extension arms 74, and cross-brace 78 are fabricated of square metal, e.g. food grade stainless steel, tubing having sufficient wall thickness to assist in effectively maintaining the rigid structure of the lifting linkage under conditions of ordinary use wherein dead weight loads of up to about 100 pounds or more may be supported in cantilever fashion by the lifting linkage.

Figure 5A:
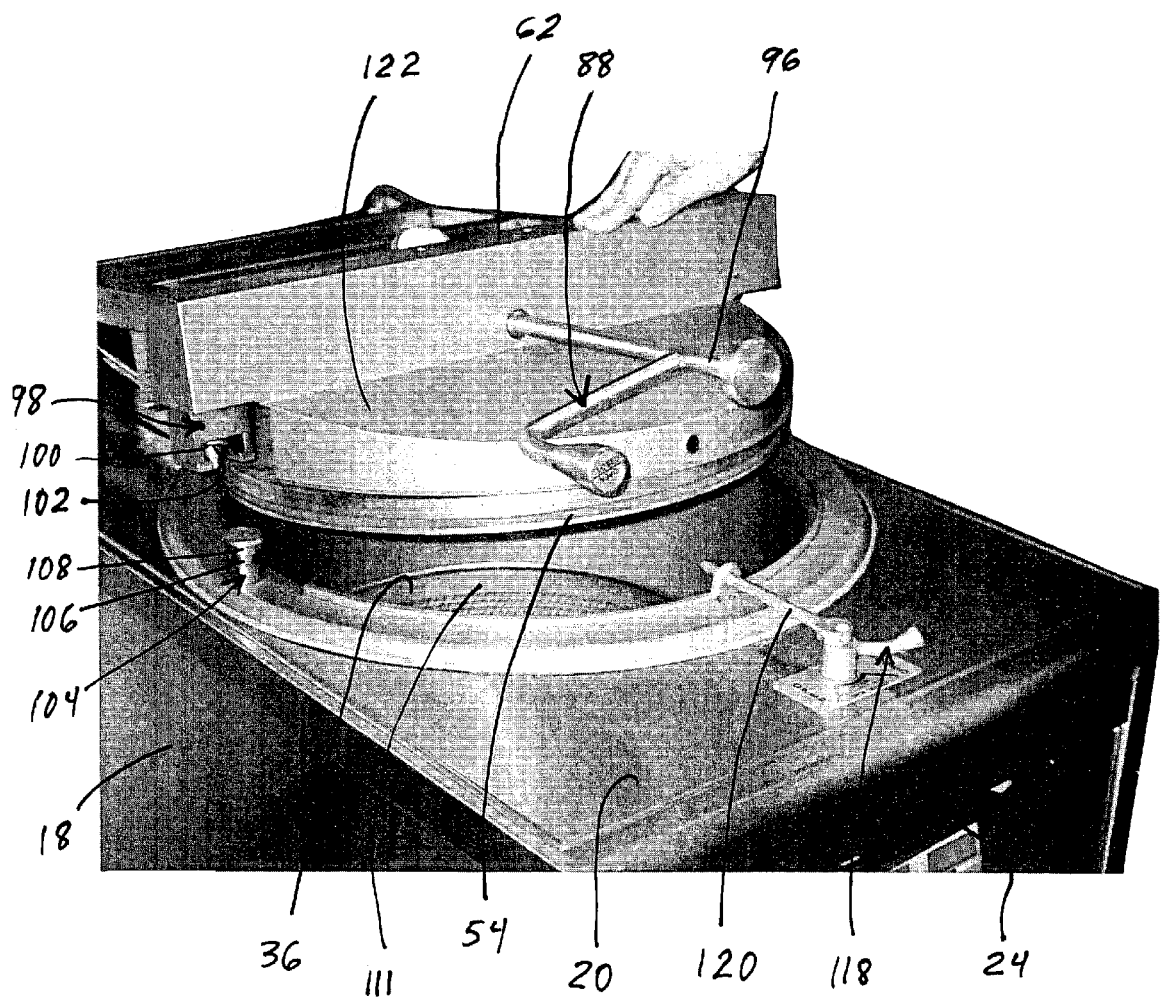
FIG. 5A shows a front pictorial view of the pressure cooker of FIG. 1 wherein the cover has been slid toward the pivot axis, to the full extent enabled, and wherein the counterbalance has begun to lift the cover to the rest position, while an operator's hand holds downward force on the cover.
Figure 5B:
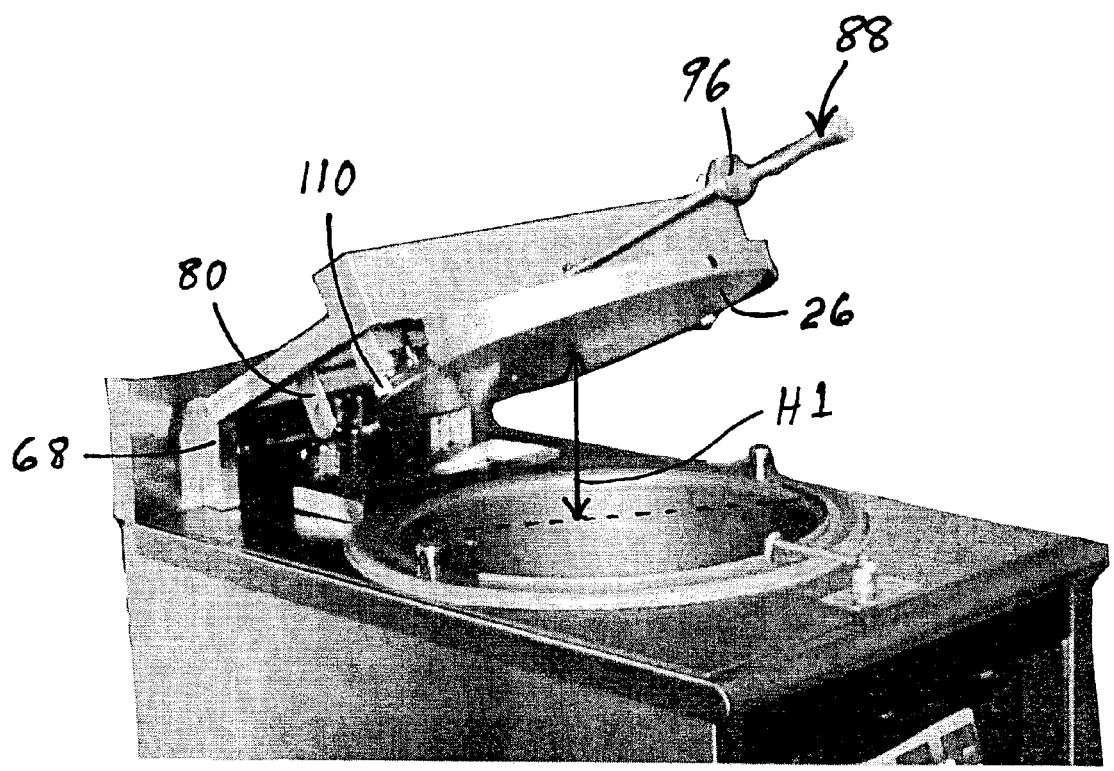
FIG. 5B shows a side pictorial view of the pressure cooker of FIG. 1 wherein the cover has been slid to the full extent enabled, toward the pivot axis, and wherein the counterbalance has lifted the cover to the rest position.
Figure 5C:
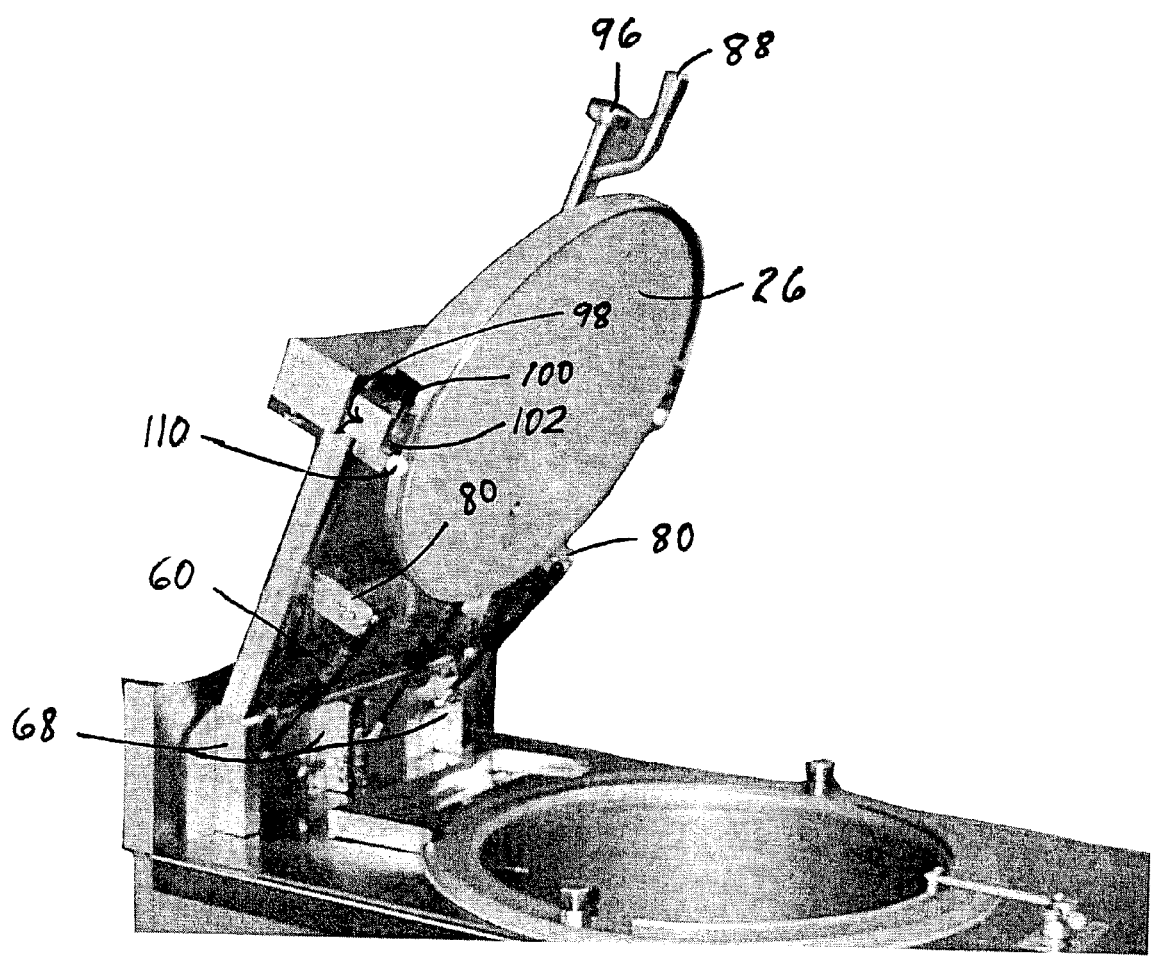
FIG. 5C shows a side pictorial view as in FIG. 5A where the cover has been lifted about the pivot axis, higher than a rest position, for full access to the cooking vessel.

Reference is now made to FIGS. 4, 5B, and 5C wherein concealing side shields have been removed from the lifting linkage. As seen therein, left and right lever arms 80 extend downwardly from cross-brace 78 generally in line with, but slightly offset from, left and right support posts 68. A third lever arm (not shown) extends downwardly from crossbrace 78 between the left and right lever arms. A third support post 68 extends upwardly from the top surface of the support structure between left and right posts 68 and in alignment with the third lever arm. Three counterbalances 60 extend between, and connect, respective lever arms 80 and corresponding support posts 68.

Suitable counterbalances are conventionally known as gas springs 60, which are available from Stabilus Company, Germany, through Van Tech Distributors, Burnsville, Minn. By suitably selecting the gas springs according to stroke and lifting force, by suitably positioning lever arms 80 a suitable distance from support posts 68, and by selecting a suitable number of gas springs, the combined lift force provided by the gas springs can be coordinated with the downward load imposed by cover 26, and the pivoting cover structure, thus to provide a desired distance of automatic lift to the cover when the cover is free from downward restraint. FIG. 5C shows the three gas springs 60 mounted with the rams oriented downwardly. FIG. 2 shows the gas springs with the rams oriented upwardly. The orientation of the rams can be suitably selected by those skilled in the art according to the task to be performed by the respective gas springs.

Referring to FIG. 6, lowering and lifting apparatus 62 includes a cover support bar 82. Yoke 84 is mounted to cover support bar 82 with the open end of the yoke facing downward. Yoke 84 and cover support bar 82 are received upwardly into cover lifting bar 86. Lift handle 88 is mounted to generally circular cam 90, away from the center of the cam, such that the cam mounting is on an eccentric. Lift handle 88 is journalled for rotation with respect to cover lifting bar 86, so as to cause eccentric rotation of the generally circular cam 90. Lift handle 88 extends outwardly through a front wall of cover lifting bar 86 and thence at an angle to the cover lifting bar thus to provide a handle which can be rotated by the user about the axis of rotation of cam 90. Cam 90 is located above cover support bar 82 and below the closed top of yoke 84. Rotation of lift handle 88 causes eccentric rotation of the cam. Such eccentric rotation of the cam brings the cam into relatively increasing or decreasing abutting relationship with the closed top of yoke 84, thus to lower or lift the yoke, and thus to lift the cover support bar and cover.

Left and right slide arms 64A, 64B are rigidly mounted to, and extend rearwardly from, cover lifting bar 86. Slide arms 64A, 64B are received into respective left and right extension arms 74 at the respective distal ends 76 of the extension arms. Each extension arm 74 contains a first slide bearing mounted inside the hollow tubular interior of the extension arm proximate the distal end 76 of the respective extension arm, and a second slide bearing spaced inwardly, toward the rear of the cooker, from the first slide bearing, a distance sufficient to provide for sliding support of the load placed on the extension arm by the cover and the lowering and lifting apparatus. Each slide arm 64A, 64B is received through both of the first and second slide bearings in the respective extension arms. Thus, the combinations of extension arms 74 and the slide bearings define the slide structure which receives slide arms 64A, 64B. The rearward end of each slide arm 64A, 64B is capped with a nut and washer to prevent the respective slide arm from being inadvertently withdrawn from the slide bearing, and thence from being inadvertently withdrawn from the respective extension arm.

Turning to FIG. 3, left and right latches 98 extend downwardly from each end of cover lifting bar 86. Each latch 98 has a T-shaped slot 100 as viewed from the front of the cooker in FIG. 3. The respective slot 100 does not extend entirely through the latch, but terminates in a rear arcuate surface 102 shown in FIG. 5A.

Left and right legs 104 extend upwardly from top panel 20 of support structure 12 in alignment with the direction of sliding of latches 98 as the cover slides from a relatively open position to a relatively closed position overlying the cooking vessel. Each leg 104 terminates in a T-shaped latch comprising a necked-down diameter portion 106 and a larger diameter portion 108. Thus, legs 104 comprise male T-shaped latches cooperative with the female T-shaped slots 100 in latches 98, such that frontward movement of the cover is stopped when the female slots engage the male latches.

Also extending downwardly from cover lifting bar 86 are left and right sliding cover supports 110 (FIGS. 2, 5C, and 6). Cover supports 110 are designed so as to reach, and slide along, the top surface of top panel 20 when downward pivotation of the pivoting cover actuation apparatus has reached its operative lower limit. Thus, when the cover is being lowered from a pivoted-up position shown e.g. in FIG. 5C, cover supports 110 prevent excessive downward pivotation of the cover actuation apparatus. Typical material for cover supports 110 is any of the high temperature polymers such as high density polyethylene, polyamide, polysulfone, polyester, and the like.

Pressure cooker 10 is used as follows, starting with the cover in the fully raised position as illustrated in FIG. 5C wherein handle 88 is shown in the "lifted cover" position to the right of central extension 96 of the lift handle. A desired amount of cooking liquid such as oil is placed in the cooking vessel. Conventional electronic cooker controls illustrated at 113 on the cooker in FIG. 1 are activated to thereby heat the oil in the cooking vessel. A basket 111 (FIG. 5A) or other container of food to be cooked is placed in the cooking vessel so as to start the cooking. The operator then grasps central extension 96 of lift handle 88 and pulls down, thus lowering cover 26. As the cover begins to come down, the force required to move the cover is minimal until the cover reaches the rest height "H1" illustrated in FIG. 5B. As the cover passes downwardly through the rest height, resistance to further lowering of the cover gradually increases and reaches a maximum when the cover reaches approximately the horizontal orientation in alignment with top panel 20, and whereat sliding cover supports 110 come into contact with top panel 20. At that position, cover 26 partially overlies cooking vessel 22 but is somewhat rearward of a full overlying relationship with cooking vessel 22 as illustrated in FIG. 5A. Namely, a first portion of the cover overlies the cooking vessel and a second different portion of the cover does not overlie the cooking vessel.

The operator then pulls forward on central extension 96, sliding the cover forward into full overlying relationship with the open top of cooking vessel 22. As the cover comes into full overlying relationship with the open top of the cooking vessel, and with cover supports 110 sliding on top panel 20, female slots 100 come into full engagement with latch legs 104, such that the male T-shaped portions 106, 108 of legs 104 are in engagement with the female T-shaped slots 100 in latches 98, as illustrated in FIG. 3. Rear arcuate surfaces 102 of the female slots come into abutment with the circular male latch portions 108 of legs 104, whereby rear arcuate surfaces 102 operate as slide stops to stop forward movement of the cover when the cover is in full alignment over the cooking vessel.

With the cover thus in full overlying relationship with the cooking vessel as in FIG. 3, lift handle 88 is rotated counter-clockwise 180 degrees from the open position of handle 88 as shown in FIGS. 3, 5B and 5C to the closed handle position shown in FIGS. 1 and 5A. Such rotation of lift handle 88 provides corresponding rotation of cam 90 whereby the eccentric mounting of the cam on lift handle 88 lowers the operative upper surface of the cam. As the upper surface of the cam is lowered, the weight of the cover moves the cover downwardly inside the inner surface of cooking vessel 22, whereby O-ring seal 54 comes into sealing engagement with the inside surface of side wall 34 of the cooking vessel at inner sealing surface 42. With the lift handle so rotated, and with the cover thus lowered into the cooking vessel, and as seen in FIG. 6, a flat spot 112 on the generally circular outer surface of the cam comes into facing relationship with a raised correspondingly flat surface 114 on cover support bar 82. A safety lip 116 is disposed on a leading edge of the cam flat spot and rotationally past flat surface 114 on the cover support bar when lift handle 88 is rotated to the lowering position shown in e.g. FIG. 1.

With the cover thus lowered into sealing engagement with the cooking vessel, a conventional cover safety latch 118 is activated from a left open position shown in FIG. 3 to a right closed position shown in FIG. 5A, whereby a piston 120 is activated to extend through cover shield 122 to a position overlying top surface 46 of the cover, thus locking the cover closed in sealing engagement with the cooking vessel. Closing safety latch 118 simultaneously closes a conventional pressure relief valve, not shown, to the cooking vessel.

Once the pressure relief valve is closed, the cooking controls can then be activated, causing pressurized cooking of the food in the cooking vessel. Typical pressure in cookers of the invention is of the order of about 1 atmosphere, thus about 12 to about 18 pounds per square inch gauge. Greater or lesser pressures can be used as desired, as low as any pressure above zero psig, and up to about 30 psig. The exact pressure used can be selected by the skilled artisan and forms no part of the invention within the range of pressures cited.

When the cooking cycle has been completed, cover safety latch 118 is opened, thereby releasing the cover from latch 118, and opening the pressure relief valve, thus to bleed the pressure from the cooking vessel. Once bleeding of pressure has been substantially completed, lift handle 88 is rotated clockwise to the open position shown in FIG. 3, as viewed by the operator, which operates cam 90 and thereby lifts cover 26 out of sealing engagement with the cooking vessel, and above the open top of the cooking vessel. At this stage, the female latches 98 are still engaged with latching legs 104 as shown in FIG. 3; and the cover still remains in fully overlying relationship over the open top of the cooking vessel.

The operator then pushes rearwardly on central extension 96 of the lift handle, sliding the cover assembly, including the cover support bar, the cover lifting bar, the yoke, the cam, and the slide arms, toward the rear of the cooker, with the slide arms sliding into extension arms 74 at the internally-carried slide bearings in the extension arms. As the cover assembly thus moves rearwardly, lifting bar 86 comes into abutting relationship with distal ends 76 of the extension arms. The abutment of the lifting bar with the distal ends of the extension arms establishes the limit of rearward movement of the cover as the cover is slid open. When the cover reaches that limit of rearward movement, the cover is still partially in overlying relationship with the open top of the cooking vessel.

As the cover and its assembled actuation apparatus so slide rearwardly toward such limit of rearward movement, gas springs 60 are acting as counterbalance, and are exerting a net upward force on the cover assembly and cover actuation apparatus, sufficient to lift the cover to the rest position at height ""H1"". Thus, as female slots 98 come free from the downward restraint applied by the male latches at legs 104, gas springs 60 automatically raise the cover a first distance to the rest height represented as "H1"and shown in FIG. 5B, and representing an angle, with respect to e.g. top panel 20, of about 30 degrees. The actual lift angle to rest height "H1" depends on the lift force applied by gas springs 60, whereby such angle and corresponding rest height "H1" can be controlled in the design of closure structure 23.

FIG. 5A shows the cover as the gas springs begin the lift toward height ""H1"". In the position shown in FIG. 5A, which is below rest height "H1", gas springs 60 exert a net lifting force on cover assembly 25 such that, if released from physical constraint, cover 26 automatically rises to rest height "H1".

At the rest height, the lifting force of the gas springs substantially matches the effective combined weight of the closure structure, namely the combined weight of the cover assembly and the cover actuation apparatus. Once the cover has reached the rest height, the operator lifts the cover to the desired, e.g. full open, height, represented in FIG. 5C. The operator can lift the cover to any pivot height above rest height "H1", and release the cover, and the cover remains at the released height as a result of the effective counterbalance effect of gas springs 60. The further lifting required to move the cover up from the rest height "H1" to any desired height, up to the full height available, can be accomplished with only minimal effort on the part of the operator.

With the cover so raised to its full-open position as in FIG. 5C, the basket or other container of cooked food is removed from the cooking vessel, completing the cooking process. The above described process can be repeated as many times as desired, each time cooking a fresh batch of food.

By using the combined actions of sliding the cover partially out of alignment with the vessel opening, and pivoting the cover upwardly and away from the opening, the precision benefits of the sliding structure are preserved while using the benefits of pivotation to enable providing an increased size cover/vessel opening within the same floor space as a cooking vessel having a lesser size opening and a cover which is displaced from over the vessel opening entirely by sliding movement.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A closure structure adapted and configured to cover and close a cooking apparatus, comprising:

(a) a cover adapted and configured to close an opening in a cooking vessel;

(b) slide structure facilitating sliding said cover in a direction transversely across such opening into a position fully overlying such opening in such cooking vessel, and away from such position fully overlying such opening in such cooking vessel wherein a first portion of said cover overlies such opening in such cooking vessel and a second different portion of said cover does not overlie such opening in such cooking vessel; and (c) pivot structure pivoting said cover about a pivot axis when said cover has been slid away from such position fully overlying such opening in such cooking vessel, said cover being comprised in a cover assembly, said cover assembly further comprising slide arms (64A, 64B) supporting said cover assembly from said slide structure and sliding into and out of said slide structure between an extended position and a retracted position.

2. A closure structure as in claim 1, further comprising biasing apparatus biasing the pivoting of said cover about the pivot axis, and wherein said biasing apparatus exerts a net lifting force on said closure structure, effective to automatically lift said cover.

3. A closure structure as in claim 2, said biasing apparatus exerting sufficient biasing force to lift said cover when said cover is out of the fully overlying relationship with the opening.

4. A closure structure as in claim 2, said biasing apparatus comprising at least one gas spring.

5. A closure structure as in claim 1, said pivot structure comprising a pivot base about which said cover is pivoted, and pivot linkage between said pivot base and said cover.

6. A closure structure as in claim 1, said cover being comprised in a cover assembly, said cover assembly further comprising cover lifting apparatus (62), and a cover support bar (82) between said cover lifting apparatus and said cover.

7. A closure structure as in claim 5, said cover being comprised in a cover assembly, said cover assembly further comprising cover lifting apparatus (62), a cover support bar (82) between said cover lifting apparatus and said cover, and slide arms (64A, 64B) supporting said cover assembly from said slide structure and sliding into and out of said slide structure.

8. A closure structure as in claim 1, said slide structure comprising an interface in a mechanical linkage between said pivot structure and said cover.

9. A closure structure as in claim 6, said slide structure comprising an interface in a mechanical linkage between said pivot linkage and said cover.

10. A closure structure as in claim 2 wherein said biasing apparatus, said slide structure, and a latch mechanism (98, 104) cooperate with each other such that opening such cooking vessel includes sliding said cover in a direction transversely across such opening, followed by pivoting said cover away from such opening.

11. A closure structure as in claim 2 wherein said biasing apparatus raises said cover a first distance, and then substantially matches the weight of said closure structure, including said cover such that said cover is substantially effectively weightless and can be moved up or down about the pivot axis with minimal effort.

12. Cooking apparatus, comprising:
(a) a support structure;
(b) a cooking vessel having an opening thereinto, said cooking vessel being supported by said support structure;
(c) a cover, controlling access to said cooking vessel through the opening; and
(d) cover actuation apparatus mounted to said support structure, said cover actuation apparatus comprising
(i) slide structure facilitating sliding of said cover
  in a direction transversely across the opening into a position fully overlying the opening in the cooking vessel, and
  away from such fully overlying position, wherein a first portion of said cover overlies the opening in the cooking vessel and a second different portion of said cover does not overlie the opening in the cooking vessel, and
(ii) pivot structure pivoting said cover about a pivot axis when said cover has been slid away from such fully overlying positions
said cover being comprised in a cover assembly, said cover assembly further comprising lowering and lifting apparatus designed and configured to lower said cover into sealing engagement with said cooking vessel, and to lift said cover out of sealing engagement with said cooking vessel.

13. Cooking apparatus as in claim 12, further comprising biasing apparatus biasing the pivoting of said cover about the pivot axis, and wherein said biasing apparatus exerts a net lifting force on said closure structure, effective to automatically lift said cover.

14. Cooking apparatus as in claim 13, said biasing apparatus exerting sufficient biasing force to lift said cover and such of said cover actuation apparatus as pivots with said cover about the pivot axis, when said cover is out of the fully overlying position.

15. Cooking apparatus as in claim 13, said biasing apparatus comprising at least one gas spring.

16. Cooking apparatus as in claim 12, said pivot structure comprising a pivot base about which said cover is pivoted, and pivot linkage between said pivot base and said cover.

17. Cooking apparatus as in claim 12, said cover being comprised in a cover assembly, said cover assembly further comprising cover lifting apparatus (62), a cover support bar (82) between said cover lifting apparatus and said cover, and slide arms (64A, 64B) supporting said cover assembly from said slide structure, and sliding into and out of said slide structure.

18. Cooking apparatus as in claim 12, said slide structure comprising an interface in a mechanical linkage between said pivot structure and said cover.

19. Cooking apparatus as in claim 17, said slide structure comprising an interface in a mechanical linkage between said pivot structure and said cover.

20. Cooking apparatus as in claim 13 wherein said biasing apparatus, said slide structure, and a latch mechanism (98, 104) cooperate with each other such that opening said cooking vessel includes sliding said cover in a direction transversely across the opening, followed by pivoting said cover away from the opening.

21. Cooking apparatus as in claim 12 wherein said cooking apparatus comprises a pressure cooking apparatus.

22. Cooking apparatus as in claim 12, said cooking vessel comprising a bottom, an encompassing side wall extending upwardly from said bottom, and a longitudinal axis extending through said bottom and generally parallel with said side wall, said pivot structure being mounted to said support structure and acting through a pivot axis extending transverse to the longitudinal axis of said cooking vessel.

23. Cooking apparatus as in claim 12, said cover actuation apparatus further comprising lifting linkages between said pivot structure and said cover, and supporting said cover from said support structure.

24. Cooking apparatus as in claim 12, further comprising slide stop apparatus (76) stopping transverse sliding opening movement of said cover while said cover partially overlies said opening in said cooking vessel.

25. Cooking apparatus as in claim 12, further comprising limiting stop apparatus (104), mounted to said support structure, said limiting stop apparatus being effective to stop sliding movement of said cover as said cover is moved into the fully overlying position.

26. Cooking apparatus as in claim 12, further comprising biasing apparatus which automatically raises said closure structure, including said cover, a first distance, and then substantially matches the weight of said closure structure such that said closure structure, including said cover, is effectively substantially weightless and can be moved about the pivot axis with minimal effort.

27. Cooking apparatus as in claim 12, said closure structure further comprising lifting linkage (58) between said pivot structure I56) and said cover assembly (25), and supporting said cover assembly (25) from said support structure (12), said slide structure slidingly connecting said lifting linkage to said cover assembly and thus to said lowering and lifting apparatus.

28. Cooking apparatus as in claim 27, said lowering and lifting apparatus being supported by said lifting linkage.

29. Cooking apparatus as in claim 12, further comprising limiting stop apparatus (104) mounted on said support structure, and engaging a latch (98) on said cover actuation apparatus, and latching said cover actuation apparatus to said support structure adjacent said cooking vessel.

30. Cooking apparatus as in claim 12, further comprising a sliding cover support (110) supporting said cover actuation apparatus from said support structure proximate said cover as said cover is slid transversely toward or away from the opening, and thus toward or away from the fully overlying position.

31. Cooking apparatus as in claim 29, further comprising biasing apparatus biasing the pivoting of said cover about the pivot axis, and wherein said biasing apparatus exerts a net lifting force on the combination of said cover and said cover actuation apparatus while said limiting stop apparatus (104) and said latch (98) are engaged.

32. Cooking apparatus, comprising:
(a) a support structure;
(b) a cooking vessel having an opening thereinto, said cooking vessel being supported by said support structure;
(c) a cover, controlling access to said cooking vessel through the opening; and
(d) cover actuation apparatus mounted to said support structure, said cover actuation apparatus comprising
  (i) slide structure facilitating sliding of said cover
    in a direction transversely across the opening into a position fully overlying the opening in the cooking vessel, and
    away from such fully overlying position, wherein a first portion of said cover overlies the opening in the cooking vessel and a second different portion of said cover does not overlie the opening in the cooking vessel, and
  (ii) pivot structure pivoting said cover about a pivot axis when said cover has been slid away from such fully overlying position,
said slide structure further comprising slide arms (64A, 64B) supporting said cover assembly and sliding into and out of said slide structure between an extended position and a retracted position.

* * * * *